Nov. 9, 1948.  H. A. ALEXANDERSON  2,453,650
ENGINE CONTROL

Original Filed Nov. 4, 1941  5 Sheets-Sheet 1

DRAIN HOLES

INDEXING
OF INNER LINER DOES NOT
AFFECT OIL HOLE CONNECTIONS
TO SERVO MOTOR.

VIEW OF
INDEXING SLOTS

Inventor
Howard A. Alexanderson.
By Herbert L. Davis, Jr.
Attorney

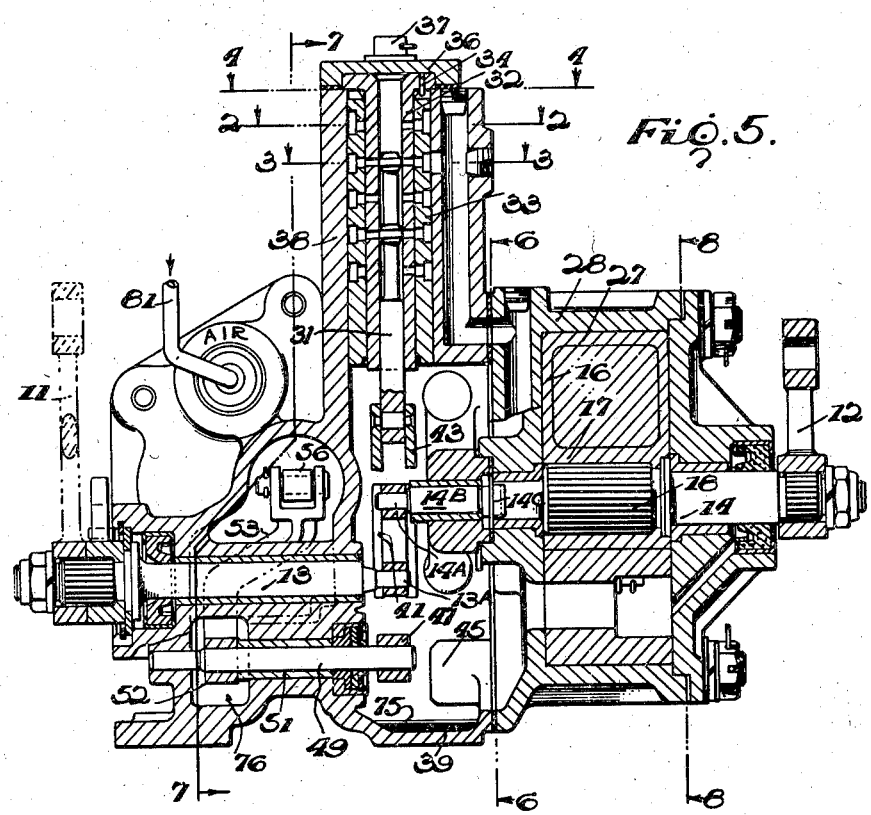

Nov. 9, 1948.    H. A. ALEXANDERSON    2,453,650
ENGINE CONTROL
Original Filed Nov. 4, 1941    5 Sheets-Sheet 3
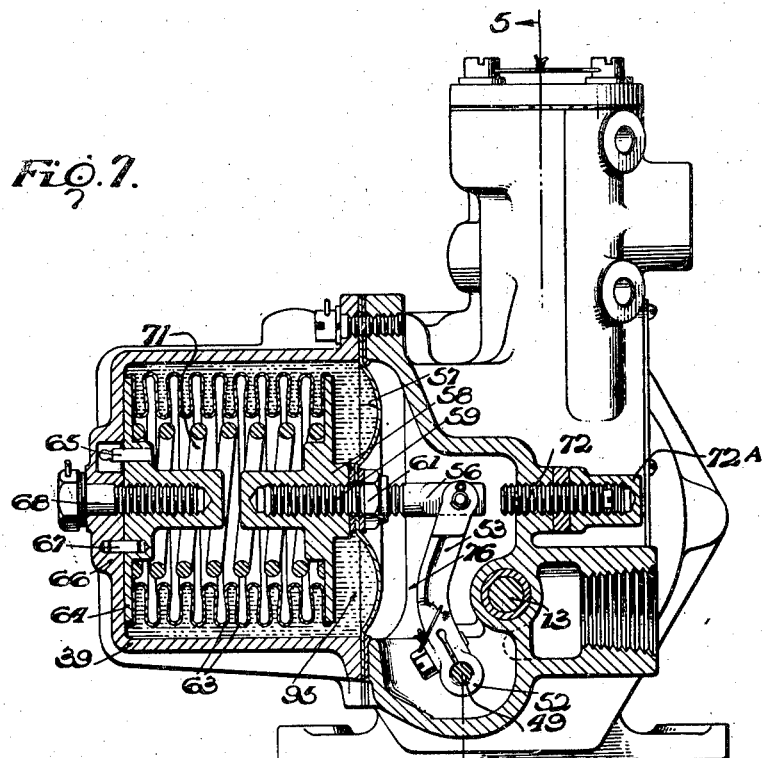
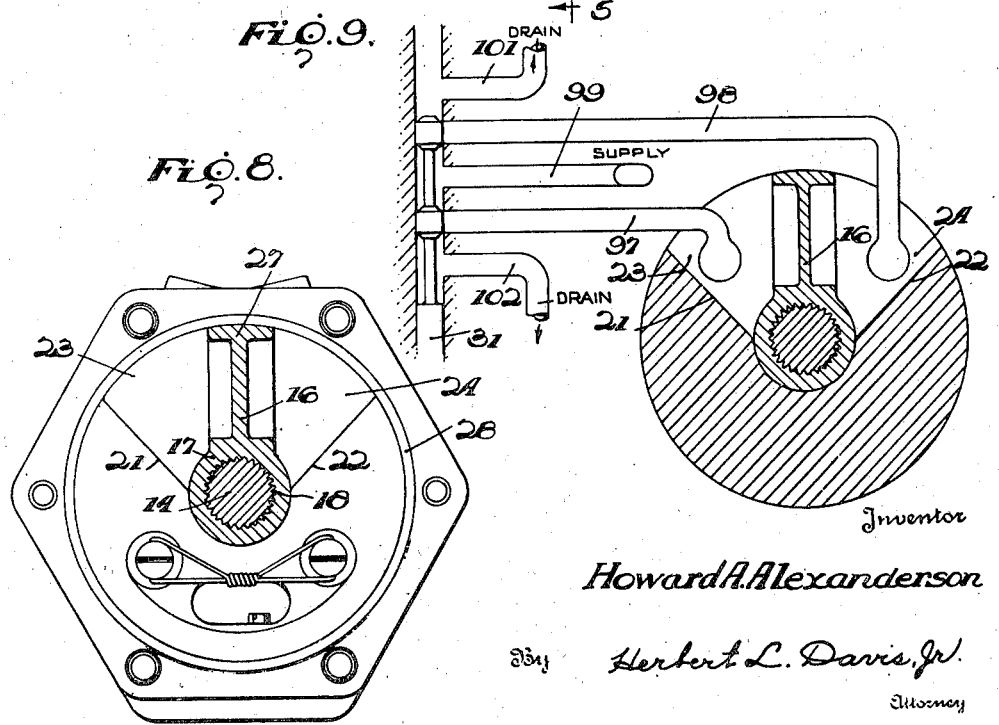
Inventor
Howard A. Alexanderson
By Herbert L. Davis, Jr.
Attorney Nov. 9, 1948.  H. A. ALEXANDERSON  2,453,650
ENGINE CONTROL
Original Filed Nov. 4, 1941  5 Sheets-Sheet 4

INVENTOR.
Howard A Alexanderson
BY
Herbert L. Davis, Jr.
ATTORNEY

Nov. 9, 1948.   H. A. ALEXANDERSON   2,453,650
ENGINE CONTROL

Original Filed Nov. 4, 1941                5 Sheets-Sheet 5

INVENTOR.
Howard A. Alexanderson
BY
Herbert L. Davis, Jr.
ATTORNEY

Patented Nov. 9, 1948

2,453,650

UNITED STATES PATENT OFFICE 2,453,650

ENGINE CONTROL

Howard A. Alexanderson, Wood-Ridge, N. J., assignor to Bendix Aviation Corporation, Teterboro, N. J., a corporation of Delaware Original application November 4, 1941, Serial No. 417,855. Divided and this application August 22, 1944, Serial No. 550,646

25 Claims. (Cl. 123—103)

The present application is a division of copending application Serial No. 417,855, filed November 4, 1941, and now U. S. Patent No. 2,358,845, granted September 26, 1944, and is a continuation in part as to all common subject matter of copending application Serial No. 508,724, filed November 2, 1943, and now abandoned. The application relates to internal combustion engine controls and more particularly to novel regulator means for governing the air supplied to the combustion chamber of an aircraft engine.

An object of the invention is to provide a novel regulating device for an aircraft engine or an aircraft supercharger.

Another object of the invention is to provide a novel simplified linkage arrangement and mechanical assembly for a regulating device.

Another object of the invention is to provide a regulating means including a novel selector shaft having an eccentric pin arranged to vary the setting of the regulator with a minimum movement.

Another object of the invention is to provide a novel simplified follow up arrangement including an adjustment shaft having an eccentric pin, arranged so as to tend to return the control means for the regulator to a neutral position.

Another object of the invention is to provide a novel means for effecting a lock out of the regulator upon the pressure selector being adjusted to a predetermined minimum pressure selecting position, whereupon operation of the regulated device may be effected by manual operation of the pressure selector.

Another object of the invention is to provide a novel eccentric pin fulcruming means for effecting the support and operation of the control linkage.

A further object is to provide a novel means for controlling the intake pressure of an aircraft engine.

These and other objects of the invention will become apparent from inspection of the following specification when read with reference to the accompanying drawings wherein is illustrated the preferred embodiment of the invention. It is to be expressly understood however, that the drawings are for the purpose of illustration only, and are not designed as a definition of the limits of the invention, reference being had to the appended claims for this purpose.

In the drawings, wherein like reference numerals refer to like parts throughout the several views:

Figure 1 is a view in elevation of one form of my invention;

Figures 2, 3 and 4 are sectional views of the valve assembly along the lines 2—2, 3—3, and 4—4, respectively, of Figure 5;

Figure 5 is a longitudinal sectional view along the line 5—5 of Figure 7;

Figure 6 is a transverse sectional view along the line 6—6 of Figure 5;

Figure 7 is a view partly in elevation and partly in section along the line 7—7 of Figure 5;

Figure 8 is a transverse view along the line 8—8 of Figure 5;

Figure 9 is a diagram of the fluid connections between the valve assembly and the servo unit;

Figure 1:
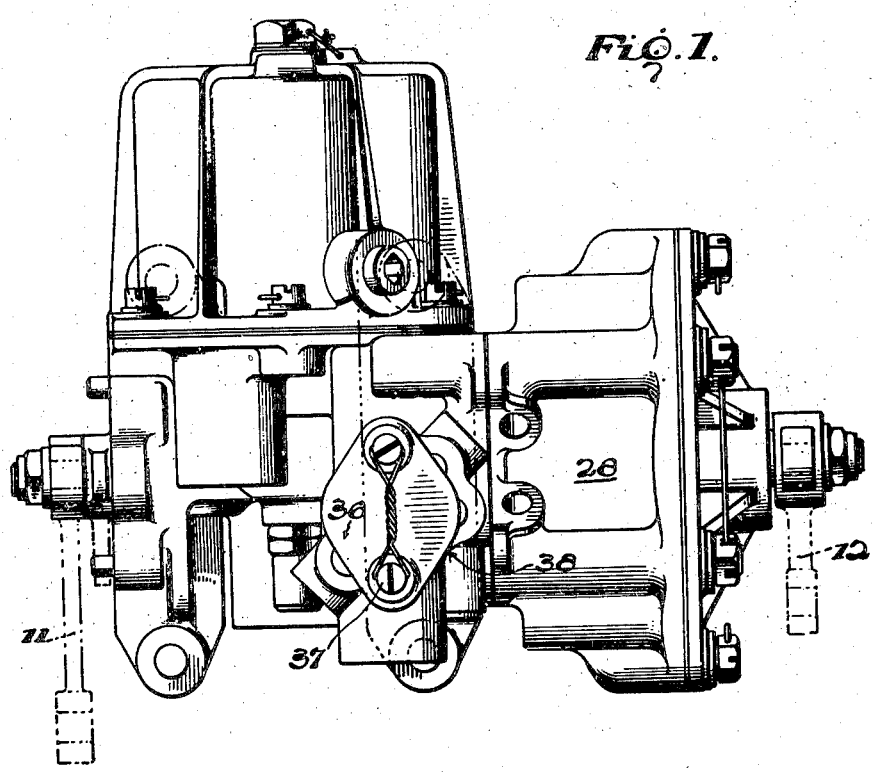
Figure 10:
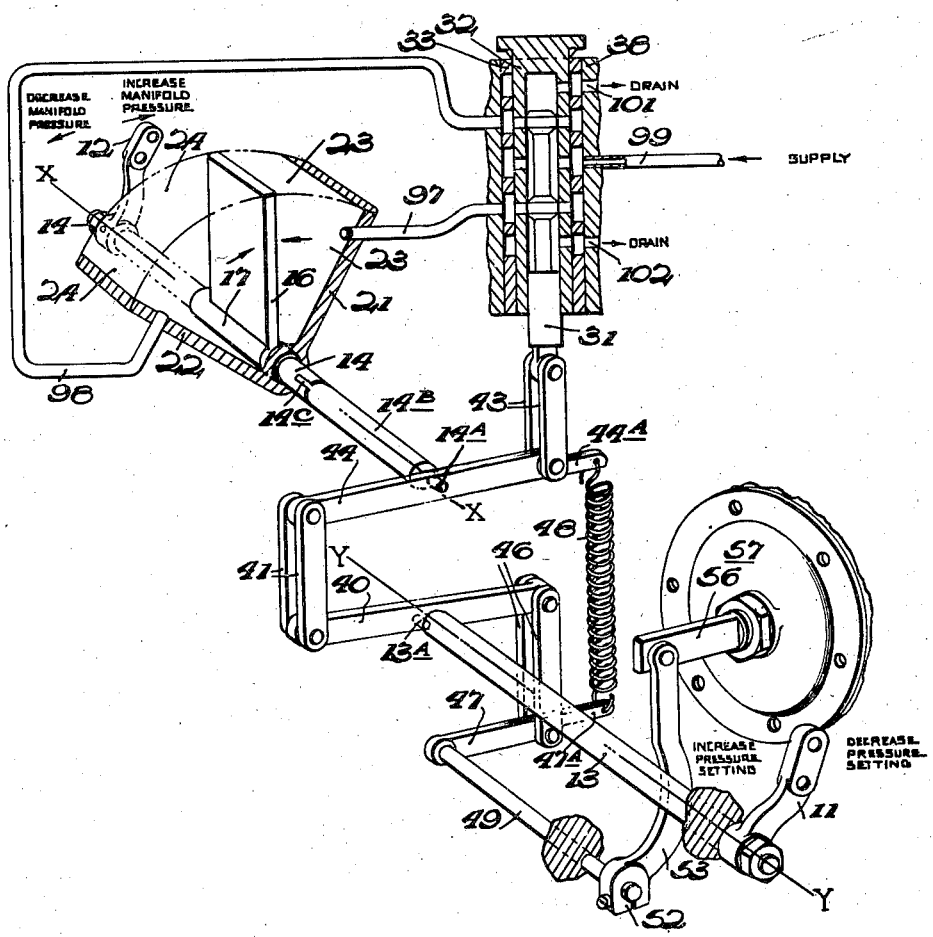
Figure 10 is a view illustrating schematically the operating linkage arrangement of the form of the invention shown in Figure 1.
Figure 11:
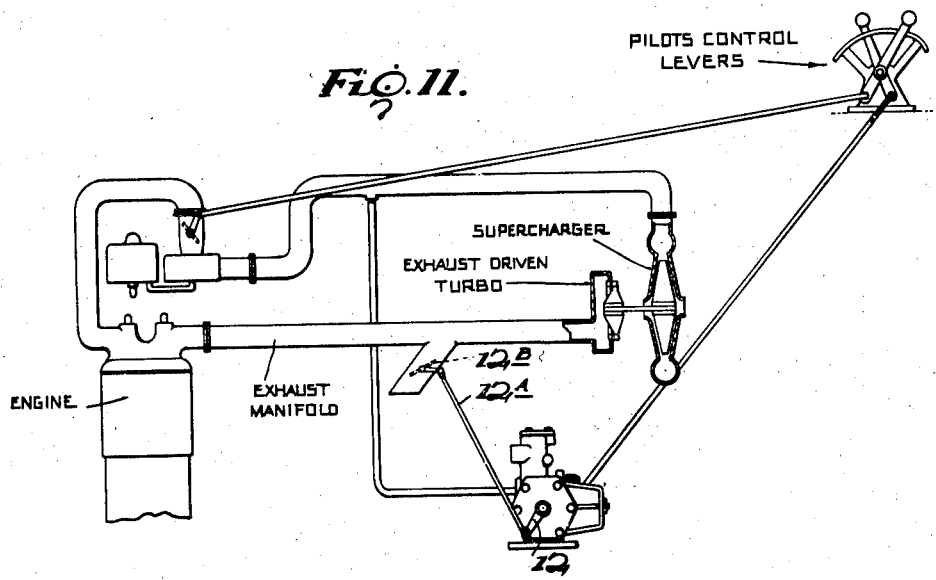
Figure 11 is a schematic view illustrating the form of the invention shown in Figure 1 applied as a regulator for the waste gate of an aircraft engine supercharger.
Figure 12:
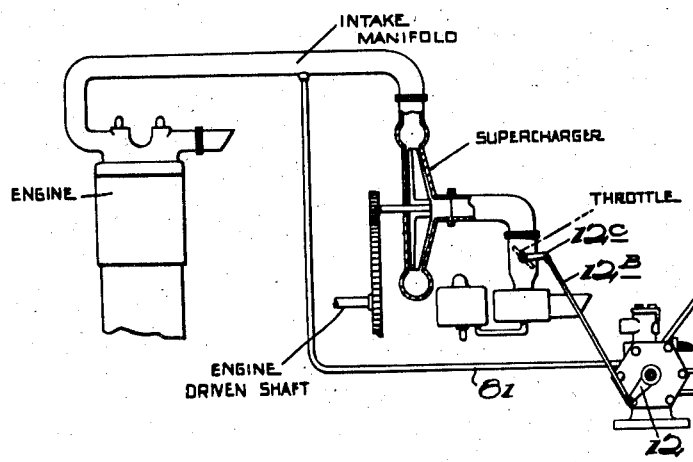
Figure 12 is a schematic view illustrating the form of the invention shown in Figure 1 applied as an aircraft engine throttle control.

Referring first to Figures 1 and 10, reference characters 11 and 12 designate levers having an operative connection with shafts 13 and 14 respectively; the lever 11 being adapted for manual operation by means of a pilot's control lever in a manner such as shown in Figures 11 and 12, and the lever 12 may be operatively connected by a link 12A to waste gate 12B of a supercharge as shown in Figure 11, or to an intake throttle 12C, of an aircraft engine as shown in Figure 12.

The shaft 14 (and therefore the lever 12) is adapted to be swung in both directions to produce a corresponding shifting of the element controlled thereby in response to automatic shifting of a servo element 16. The servo element 16 has provided a hub portion 17 (Figures 5 and 8) internally splined or serrated to engage corresponding splines or serrations 18 on the central portion of the shaft 14. The servo element 16 is shown in Figure 8 as in the form of a rockable piston or vane, movable between two radial abutments 21 and 22 in response to the admission and exhaust of fluid pressure to and from the sector shaped chambers 23 and 24 which are formed by the abutments 21 and 22 on the one hand, and the vane 16 on the other; the outer portion 27 of the vane being adapted to fit snugly upon the inner cylindrical surface of the housing member 28 for fluid tight engagement therewith.

The means for controlling the alternate supply to, and exhaust from, the chambers 23 and 24 is shown as including a valve assembly consisting of a central movable plunger portion 31 (see Figures 5 and 10), an inner valve sleeve 32 and an outer valve sleeve 33; the inner sleeve 32 being rotatable in respect to the other for proper indexing of the ports therein, after which the unit is fixed in the adjusted position by pin 34, cap 36 and a final securing element 37.

The valve assembly is housed in a central portion 38 which extends upwardly from the main housing 39 of the device, and is located directly above the operating linkage connecting the manually operable shaft 13 with the valve 31. As probably best shown in Figure 10, the latter connecting means includes a pin portion 13A provided at the inner end of the shaft 13 and positioned in eccentric relation to the axis of rotation of the shaft 13, indicated by line y—y.

Fulcrumed on the eccentric pin portion 13A is a lever 40 which is operably connected at one end by linkage members 41 to one end of a second lever 44. The lever 44 is connected at the opposite end by linkage members 43 to the valve plunger 31.

The lever 40 is further connected through linkage members 46 to an arm 47 fixedly connected to a rockshaft 49 journaled in a bearing 51, carried by the housing 39. The rockshaft 49 is adapted to receive at the opposite end an apertured end portion 52 of a lever 53 which is suitably fastened thereto. The lever 53 is operatively connected through a reciprocable element 56 to a pressure responsive membrane or diaphragm element 57, as will be explained hereinafter.

The lever 44 and arm 47 have projecting end portions 44A and 47A respectively. Between the projecting end portions 44A and 47A there is connected a spring 48 to assure a more accurate mechanical fit between the various linkage elements and to take up frictional wear which may result through continued operation of the device. The lever 44 previously noted is fulcrumed on a pin 14A provided at the end of a shaft 14B. The shaft 14B is connected by a key 14C to the shaft 14. The pin portion 14A is positioned in eccentric relation to the axis of rotation of the shaft 14 and 14B, indicated by line x—x.

The link 44 is so pivotally mounted on the inner pin portion 14A that the link 44 will swing in response to rotation of shaft 14—14B; but the pin and link 44 are not rigidly fastened, one to the other, as the link 44 can also be swung by movement of the link 41, even though the shaft 14—14B and inner pin portion 14A of the shaft 14B are held stationary by the balanced pressures acting upon opposite sides of vane 16.

The same is true of the connection between the inner pin portion 13A of the shaft 13 and the arm 40. Thus, movement may be imparted to the arm 40 connecting links 41 and 46 by movement of the eccentric pin portion 13A and also by independent movement of links 41 and 46 effected through operation of the pressure responsive element 57.

The lever 53, as previously described, has an operative pivotal connection with the outer end of a reciprocable element 56 constituting part of the pressure responsive diaphragm assembly whose flexible membrane or diaphrgam element is shown at 57. The diaphragm assembly is covered in U. S. Patent No. 2,358,845, granted September 26, 1944, and assigned to Bendix Aviation Corporation. The diaphragm assembly also includes a centrally bored and threaded plate 58 with which the corresponding threads 59 of the member 56 have operative engagement. A nut 61 is also threadedly engaged with the member 56 and serves to clamp the flexible diaphragm 57 to the member 58 at the central portion of the diaphragm. Attaching to the plate 58 at its periphery is a flexible corrugated sheet 63 whose opposite end attaches to the periphery of a plate 64 which is secured to the end surface 66 of the housing 39 as indicated at 67 and 68. The member 63 thus constitutes a bellows adapted to be pre-evacuated, and a coiled compression spring 71 is mounted in the bellows to urge the plate 58 (and hence the diaphragm 57) in a rightward direction as viewed in Figure 7, thereby opposing the collapsing tendency of the evacuated bellows, and holding the latter in equilibrium. A screw 72 is provided for limiting movement of member 56 in response to expansion of the bellows 63 under the biasing force of the spring 71. The screw 72 projects through the housing wall 39 and may be adjusted from the exterior thereof upon removal of a cap 72A.

It will be seen that by appropriate adjustment of the screw 72 the movement of the reciprocable element 56 may be limited as desired and accordingly the adjustment of the shaft 49. Upon such limitation to the adjustment of the shaft 49, the valve 31 may be controlled by manual operation of the lever 11 and shaft 13 independently of the bellows 57 and without interference from said limiting means.

Fluid under pressure is supplied by means of an oil pump (not shown) operated by suitable driving means and from the said pump the oil under pressure is adapted to be supplied to the chambers 23 and 24 of the servo unit under the control of the movable plunger 31 of the valve assembly, which plunger is in turn under the control of the linkages 47, 46, 40, 41, 44, and 43. The said linkages are in a central chamber 75 provided in the housing 39. The linkage 46 is operably connected to one end of a rockshaft 49, which is in turn connected at the opposite end to the lever 53 movably mounted in a chamber 76. The lever 53 is connected to the reciprocable member 56 and is urged in one direction by the pressure of the spring 71 upon the elements 58 and 57, and in the opposite direction by the pressure of a fluid medium supplied to the chamber 76 by way of a conduit shown at 81 in Figure 5, which conduit may be connected at its opposite end to the carburetor inlet manifold as shown in Figure 11 or to the intake manifold of an aircraft engine as shown in Figure 12.

Oil or other liquid is provided for filling the space between the elements 63 and 58, on the one hand, and the inner surface of the slack diaphragm 57 on the other. This oil constitutes a damping agency as well as constituting the means for transmitting to the bellows 63 the pressure being supplied to the diaphrgam 57 by the fluid medium entering the chamber 76 by way of conduit 81. In other words, the pressure which opposes the spring 71 (and therefore, in conjunction with said spring constitutes the operating means for the valve shifting linkage 56, 53, 49, 47, 46, 40, 41, 44, 43) is transmitted by the slack diaphragm 57 directly to the oil in space 95, and from said oil the pressure is transmitted to the bellows 63. Hence the slack diaphragm 57 is not loaded in any way whatever, and serves merely to retain the oil in the space 95. Thus there is provided means for damping the vibrating tendency (which is characteristic of a bellows of the type indicated at 63) which means at the same time serves to segregate the damping liquid from the supply of fluid medium which is introduced to the chamber 75 by way of the conduit 81.

Figures 9 and 10 show diagrammatically the manner in which the shifting of the plunger 31 of the valve assembly operates to supply fluid to one side or the other of the servo-motor 16 of Figure 8, while at the same time permitting an exhaust of operating fluid from the opposite side thereof; the conduits connecting the valve chamber with the two chambers 23, 24 of the servo unit being indicated at 97 and 98, and the supply conduit at 99, while the two exhaust ("drain") passages are indicated at 101 and 102, the former being the exhaust passage when chamber 24 is being evacuated by way of conduit 98, and the passage 102 being the exhaust passage when the chamber 23 is being evacuated by way of conduit 97.

The word "indexing" as used herein means the turning of one of the valve sleeves 32 or 33 with respect to the other, to bring about the desired radial alignment of the ports of one with those of the other.

Figure 2:
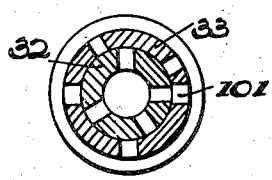
Figure 3:
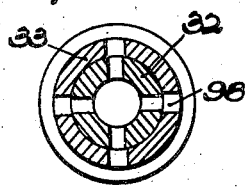
Figure 4:
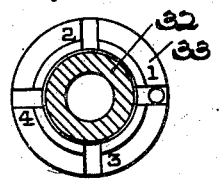

It will be seen that by turning the valve sleeve 32 ninety degrees in a counter-clockwise direction as viewed in Figure 2, two of the outlet ports will open into the drain 101; upon turning the same one hundred and eighty degrees four of the ports will open into the drain 101 and upon turning the sleeve 32 two hundred and seventy degrees three of the ports will open into the drain 101. The ports of the sleeve 32 opening into the drain 102 are similarly arranged.

Once this "indexing" has been accomplished, there is no further relative rotation between these valve sleeves. That is, the alternate opening and closing of the several ports is accomplished, during operation of the device, by the rectilinear motion of the valve plunger 31, and not by any relative movement of elements 32 and 33. The relative movement of the sleeve 32, as described, serves to calibrate the outlet to the drains 101 and 102, so that the servo mechanism may be readily adjusted for the particular work involved.

The improved regulator is arranged to control the induction system of an aircraft engine. Such induction systems are of course well known in the art as well as regulators for the same as shown for example in the U. S. Patent No. 2,024,202, granted December 17, 1935, to Adolph Berger. For purposes of illustration, however, typical systems are shown diagrammatically in Figures 11 and 12.

In the operation of my regulator in a system such as shown in Figures 11 and 12, the valve plunger will remain in the neutral position so long as the waste gate setting of Figure 11 or the carburetor throttle setting of Figure 12 is correct for maintenance of the desired pressure in the carburetor intake manifold as in the intake manifold of the engine respectively, at the engine loading and altitude concurrently prevailing. When engine loading or altitude changes, however, the said manifold pressure will change correspondingly. If the manifold pressure increases the pressure in chamber 76 will increase correspondingly, as the chamber 76 is connected to the said manifold by the conduit 81. This pressure increase will cause displacement of the slack diaphragm 57, and the pressure thus exerted upon the interposed liquid 95 will cause a contraction of the bellows 63—the liquid itself being incompressible, of course. The resulting contraction of the bellows 63 (axially) will cause member 56 of Figure 10 to shift to the right, and this will cause arm 53 to turn the rockshaft 49 in the bearing 51 in a clockwise direction. This turning will move the linkage 47, 46, 40, 41, 44 and 43 and hence the valve plunger 31 will be shifted to a lower position. This shift of the valve plunger 31 will establish two parallel paths of flow; one path being from servo-motor chamber 24 to the outlet 101 (Figures 9 and 10) and the other path being from pressure source 99 to the servo-motor chamber 23. The pressure thus exerted on vane 16 of the servo motor will cause rotation of shaft 14 in a counter-clockwise direction, as viewed in Figure 10, so as to effect through arm 12 a corresponding change in the throttle or waste gate setting, as shown in Figures 11 and 12, to effect a decrease in the manifold pressure in order to restore the intake manifold pressure to the predetermined value. Thus the waste gate of Figure 11 will be progressively opened, while the throttle of Figure 12 will be progressively closed. Upon such rotation of shaft 14 a corresponding movement will be imparted to shaft 14B and eccentric pin 14A, causing the shaft 14B and pin 14A to move in a counter-clockwise direction as viewed in Figure 10 due to the eccentricity of the pin portion 14A of the shaft 14B in relation to the axis of rotation of the shaft 14B. Such movement of the pin 14A will cause the link 44 to swing on its pivotal connection to the link 41 in a counter-clockwise direction so as to tend to raise valve plunger 31 to the neutral position, which together with an expansion of the diaphragm 57 to the left due to decrease in the manifold pressure will effect a return of the valve 31 to a neutral position. The action of the pin 14A thus tends to anticipate the change in pressure effected by the adjustment of the arm 12 and provides a "follow-up" arrangement which gives stability to the control device. When manifold pressure drops below the predetermined point, the bellows 63 will expand to shift member 56 to the left as viewed in Figure 10, and the linkage will then cause valve plunger 31 to move to a higher position. Again two parallel paths of flow will be established, but this time they will operate to swing vane 16 in the opposite or clockwise direction, as viewed in Figure 10 thus shifting the arm 12 oppositely to the direction heretofore referred to so as to increase the intake manifold pressure. The "follow-up" action of the pin 14A moving in a clockwise direction will actuate link 44 so as to tend to again restore the valve 31 to a neutral position when manifold pressure has been restored to normal.

Likewise upon manual adjustment of the lever 11 there will be imparted a movement to the eccentric inner pin portion 13A of the shaft 13, which as previously explained will cause the link 40 horizontally connecting the links 46 and 41 to swing in such a manner as to pivot on its connection to the link 46 so as to move the linkages 41, 44, 43 and hence the valve plunger 31 in a direction to effect an adjustment of the throttle or waste gate setting. The latter movement will also effect an adjustment of the value of the manifold pressure setting at which the bellows 57 will adjust the valve plunger 31 to a neutral position.

Thus it will be seen that by adjusting the lever 11 in a counter-clockwise direction as viewed in Figure 10, the pin 13A will move about the axis y—y and thus the fulcrum point of the lever 40 will be adjusted downward causing a counter-clockwise movement of the lever 40 about its pivotal connection to the links 46. Such movement of the lever 40 will impart a downward movement to the links 41 causing a counter-clockwise movement of the lever 44 about the pin 14A, effecting an upward movement to the links 43 and valve 31. Thus operation may be effected of the arm 12 in a counter-clockwise direction for increasing the pressure in the said manifold by appropriate adjustment for example of the waste gate 12B of Figure 11 for increasing the driving speed of the supercharger or as shown in Figure 12 by further opening the throttle.

It will be further seen that by changing the fulcrum point of the lever 40 by the aforenoted adjustment of the pin 13A, the determined pressure setting to be maintained by the diaphragm 57 is increased.

Likewise the determined pressure setting to be maintained by the diaphragm 57 may be decreased by moving the lever 11, as viewed in Figure 10, so as to adjust the eccentric pin 13A in a clockwise direction about the axis of rotation y—y and thus the fulcrum point of the lever 40.

The follow up action of the pin 14A, previously described, will of course upon rotation of the shaft 14B in response to adjustment of the shaft 13 and eccentric pin 13A tend to restore the valve plunger 31 to a neutral position.

It will be further seen that through appropriate adjustment of the screw 72 the operation of the regulator may be conveniently transferred from automatic to manual control upon operation of the lever 11 so as to select a pressure below that at which the element 56 is limited by the screw 72. There is thus provided novel means for effecting manual control of the motor 16 within limits dependent upon the adjustment of the screw 72. The control of the valves 12B or 12C may be thus shifted from automatic to manual control at the will of the pilot or operator.

It will be readily seen that upon adjustment of the lever 11 within the manual range, the valve 31 will be adjusted to one side of the neutral position causing movement to be imparted to the motor 16 and adjustment of the eccentric pin 14A so as to return the valve 31 to its neutral position. Thus the regulator may be manually controlled at the will of the operator within a range determined by the adjustment of the screw 72.

Although the present invention is only described and illustrated in detail for one embodiment thereof, it is to be expressly understood that the same is not limited thereto. Various changes may be made in design and arrangement of the parts illustrated, as will now be apparent to those skilled in the art. For a definition of the limits of the invention, reference should be had to the appended claims.

What is claimed is:

1. A control mechanism comprising in combination a floating lever, control means connected to the lever, motor means including a vane, a shaft pivotally supporting said vane, said vane being controlled by the control means, actuating means operatively connected to said lever to affect said control means, and a follow up mechanism between the shaft and the floating lever, including a member mounted at one end of and in eccentric relation to said shaft and operably connecting said shaft and said floating lever, said member directly supporting said floating lever in pivotal relation to said shaft.

2. A control mechanism comprising in combination a floating lever, control means connected to the lever, motor means including a shaft, a vane extending radially from said shaft and pivotally supported thereby, said vane being controlled by the control means, and a follow up mechanism between the shaft and the floating lever, including an eccentric pin provided at one end of said shaft and pivotally supporting said floating lever, and a control member affixed at the opposite end of said shaft and adjustably positioned by said motor means.

3. A control mechanism, comprising, in combination, a floating lever, a valve connected to one end of said floating lever, control means connected at the other end of said floating lever, hydraulic motor means including a shaft, a vane projecting radially from said shaft and pivotally supported thereby, said vane being operably controlled by the valve, a follow up mechanism between the shaft and the floating lever, including an eccentric pin provided at one end of said shaft and pivotally supporting said floating lever at a point intermediate the opposite ends of said floating lever, and a control member affixed to said shaft and adjustably positioned by the motor means.

4. A control mechanism, comprising, in combination, a floating lever, a valve connected to one end of said floating lever, a membrane responsive to changes in an operating condition, said membrane operably connected to the other end of said lever, hydraulic motor means including a shaft, a vane projecting radially from said shaft and pivotally supported thereby, said vane being operably controlled by the valve, a follow up mechanism between the shaft and the floating lever, including an eccentric pin provided at one end of said shaft and pivotally supporting said floating lever at a point intermediate the opposite ends of said floating lever, and a control member affixed to said shaft and adjustably positioned by the motor means.

5. A control mechanism, comprising, in combination, a first floating lever, a valve connected to one end of said first floating lever, a second floating lever having one end operably connected to the other end of the first floating lever, means pivotally supporting the second floating lever at a point intermediate the opposite ends thereof, a membrane responsive to changes in an operating condition, said membrane operably connected to the other end of said second floating lever, hydraulic motor means being operated by the valve, said motor means including a vane, a shaft pivotally supporting said vane, and a follow up mechanism between the shaft and the first floating lever, including an eccentric pin provided at one end of said shaft and pivotally supporting said first floating lever at a point intermediate the opposite ends of said first floating lever.

6. A control mechanism, comprising, in combination, a first floating lever, a valve connected to one end of said first floating lever, a second floating lever having one end operably connected to the other end of the first floating lever, a rotary control member, an eccentric pin provided at one end of said rotary member and pivotally supporting said second floating lever at a point intermediate the opposite ends thereof, a membrane responsive to changes in an operating condition, said membrane operably connected to the other end of said second floating lever, hydraulic motor means being operated by the valve, said motor means including a vane and a shaft rotatably supporting the vane, and a follow up mechanism between the shaft and the first floating lever, including an eccentric pin provided at one end of said shaft and pivotally supporting said first floating lever at a point intermediate the opposite ends of said first floating lever.

7. A control mechanism, comprising, in combination, a floating lever, control means connected to one end of the floating lever, a membrane responsive to changes in an operating condition, said membrane operably connected to the other end of said lever, motor means being operated by the control means, a shaft driven by said motor means, a follow up mechanism between the shaft and the floating lever, including an eccentric pin provided at one end of said shaft and pivotally supporting said floating lever at a point intermediate the opposite ends of said floating lever adjustable lockout means limiting the operation of said lever by said membrane, and manually operable means connected to the lever for actuating said control means independently of said membrane.

8. A control mechanism, comprising, in combination, a floating lever, control means connected to one end of the floating lever, a membrane responsive to changes in an operating condition, means operably connecting said membrane to the other end of said floating lever, means for locking said membrane out of operative relation, means connected to said connecting means for operating said control means independently of said membrane, motor means being operated by the control means, a shaft formed a part of said motor means, a follow up mechanism between the shaft and the floating lever, including a pin provided at one end of said shaft and positioned in eccentric relation to said shaft, said pin projecting into and pivotally supporting said floating lever at a point intermediate the opposite ends of said floating lever.

9. A control mechanism, comprising, in combination, a floating lever, control means operably connected to one end of said floating lever, a membrane responsive to changes in an operating condition, means operably connecting said membrane to the other end of said floating lever, means for locking said membrane out of operative relation, and means pivotally supporting said floating lever at a point intermediate the opposite ends thereof for operating said control means independently of said membrane.

10. A control mechanism, comprising, in combination, a floating lever, control means operably connected to one end of said floating lever, a membrane responsive to changes in an operating condition, means operably connecting said membrane to the other end of said floating lever, means for locking said membrane out of operative relation, and eccentric pin means pivotally supporting said floating lever at a point intermediate the opposite ends thereof for operating said control means independently of said membrane.

11. A control mechanism for an aircraft engine, comprising, in combination, a shaft adopted to be connected to a pilot's control lever, motor means adopted to be connected so as to regulate the pressure in the induction system of said engine, control means for said motor means, means for connecting said shaft so as to control the operation of said motor control means, said connecting means including a first floating lever, a first eccentric means operably connecting said shaft to said first floating lever and pivotally supporting said first floating lever, a second floating lever operably connecting said first floating lever to said motor control means; a follow up mechanism between the motor means and the second floating lever, including a second eccentric means driven by said motor and operably connecting said motor means to said second floating lever and pivotally supporting said second floating lever; a boost control connected to said first floating lever and arranged to operate said motor control means through said first and second floating levers in such a manner as to maintain the pressure in the induction system of said engine at a selected value, and said first eccentric means arranged to change the said selected value upon adjustment of said shaft.

12. A control mechanism for an aircraft engine, comprising, in combination, a first shaft adopted to be connected at one end to a pilot's control lever, motor means, a second shaft driven by said motor means and adopted to be connected to means for regulating the pressure in the induction system of said engine, control means for said motor means, means for connecting said first shaft so as to control the operation of said motor control means, said connecting means including a first floating lever, a first eccentric pin provided at the other end of said first shaft for operably connecting said first shaft to said first floating lever at a point intermediate the opposite ends of said first floating lever, a second floating lever connected at one end to said motor control means and operably connected at the other end to one end of said first floating lever; a follow up mechanism between the motor means and the second floating lever, including a second eccentric pin provided at one end of said second shaft and operably connecting said second shaft to said second floating lever at a point intermediate the opposite ends of said second floating lever; a boost control connected at the other end of the first floating lever and arranged to operate said motor control means through said first and second floating levers in such a manner as to maintain the pressure in the induction system at a preselected pressure value, and said first eccentric pin arranged to change the said selected pressure value adjustment of said first shaft.

13. A control mechanism for an aircraft engine, comprising, in combination, a rotary motor means for regulating an operating condition of said engine, a control means for said motor means, a membrane responsive to changes in said operating condition, means operably connecting said membrane to said motor control means, a rotatable shaft, a pin projecting from one end of the shaft in eccentric relation thereto, said pin operably connected in said connecting means between said membrane and said control means for effecting said control means independently of said membrane, a second pin eccentrically mounted relative to said rotary motor means and operably connected to said motor means and in said connecting means between said membrane and said control means for effecting a follow up action on said control means upon rotation of said motor means.

14. The combination with an internal combustion engine having an intake conduit and a valve for controlling the flow of combustible mixture to said intake conduit, power means adjusting the position of said valve, automatic means responsive to engine intake pressure for effecting the position of said valve through said power means, manually operable means for effecting the position of said valve through said power means, stop means to lock out of operation said automatic means, said stop means adjustably arranged to effect a transfer of the control of said power means from automatic to manual control, said stop means being arranged in such a manner that said manually operable means may independently control the position of said valve through said power means without interference from said automatic means, and means responsive to movement of said manually operable means for adjusting the setting of said automatic means.

15. The combination with an aircraft engine and a valve for controlling an operative condition of the engine, of a power means for adjusting the position of said valve, automatic means responsive to changes in atmospheric pressure and an operative condition of the engine for controlling the position of said valve through said power means, manually operable means for controlling the position of said valve through said power means, means arranged to effect a transfer of the control of said valve from automatic to manual control at will, said last mentioned means being arranged in such a manner that said manually operable means may independently control the position of said valve through said power means without interference from said automatc means, and means responsive to movement of said manually operable means for adjusting the setting of said automatic means.

16. A device of the character described, comprising, in combination, motor means for adjusting a control device, an engine operating condition responsive means for controlling said motor means so as to maintain a predetermined operative condition of the engine, a manually operable control member for adjusting the setting of said condition responsive means, and means for limiting the range of control of said motor means by said condition responsive means, said last mentioned means being arranged in such a manner that said control member may solely control within a predetermined operating range the position of said motor means without interference from said limiting means.

17. A device of the character described, comprising, in combination, engine operating condition responsive means, power means controlled by said condition responsive means for automatically positioning a control device, a control member for changing the datum of said automatic means, and means for limiting the control of said power means by said condition responsive means, said limiting means being arranged in such a manner that said control member may control the position of said control device through said power means without interference from said limiting means and within a predetermined range of operation of said control member.

18. A device of the character described, comprising, in combination, engine operating condition responsive means, power means controlled by said condition responsive means for automatically adjusting a control device, a control member for changing the datum of said automatic means, and means for limiting the control of said power means by said condition responsive means, said limiting means being arranged in such a manner that said control member may control position of said control device through said power means and within a predetermined range of operation of said control member without interference from said limiting means, and means for adjusting said limiting means so as to vary the predetermined range.

19. A device of the character described, comprising, in combination, engine operating condition responsive means for adjusting a control device so as to maintain a predetermined condition, manually operable means for varying the datum of said condition responsive means, means for limiting the adjustment of said control device by said condition responsive means, and said last mentioned means being arranged in such a manner that said manually operable means may control the position of said device without interference from said limiting means.

20. In a control for an internal combustion engine throttle, a servo motor including a power member and a control member, means connecting the power member to the throttle, induction pressure responsive means for varying the position of the control member, means for changing the setting of said pressure responsive means, means operative when the pressure setting of said pressure responsive means is below a predetermined value for limiting the operation by said pressure responsive means, of said control and said setting changing means arranged so as to control the position of said control member during the latter limited operation without interference from said limiting means.

21. In a control for an internal combustion engine, means for controlling an operative condition of the engine, a servo motor including a power member and a control member, means connecting the power member to the engine control means, engine operating condition responsive means for varying the position of the control member, manually operable means for changing the datum of said condition responsive means, means for limiting the operation by said condition responsive means of said control member when the datum of said condition responsive means is adjusted to within a predetermined range, and said manually operable means arranged to effect manual actuation of said control member within said predetermined range and without interference from said limiting means.

22. In a control for an internal combustion engine throttle, a servo motor including a power member and a control member, means connecting the power member to the throttle, an element movable in response to the intake manifold pressure of said engine, means connecting said element to said control member so that said element may vary the position of said control member upon change in such pressure, manually operable means connected to the last mentioned connecting means and arranged so as to vary the relationship of said control member and element, an adjustable member arranged so as to limit the movement of said element, and said manually operable means arranged so as to solely control said control member through said connecting means upon such limitation to the movement of said element so as to provide manual control of the position of said throttle through the power member.

23. The combination with an internal combustion engine having an intake conduit and a throttle valve for controlling flow of combustible mixture to said intake conduit, of manually operable means for controlling the position of said valve, automatic means responsive to engine intake pressure for controlling the position of said valve, means for transferring alternatively from manual to automatic control throughout the range of operation of said throttle valve, and means responsive to movement of said manually operable means for adjusting the setting of said automatic means.

24. A device of the character described, comprising, in combination, condition responsive means for automatically adjusting an engine operating control device, a control member for adjusting said automatic means, and means for limiting the adjustment of said control device by said automatic means upon a predetermined adjustment of said control member, said last mentioned means being arranged in such a manner that said member may independently adjust said control device without interference from said limiting means.

25. For use with a supercharged engine having an intake conduit and an exhaust conduit, and a valve for regulating fluid pressure in one of said conduits; a control mechanism comprising, in combination, means for adjusting the position of said valve, automatic means responsive to the fluid pressure in one of said conduits and to control the position of said valve through said first mentioned means, a single manually operable member to control the position of said valve through said first mentioned means, means arranged to effect a transfer of the control of said valve from automatic to manual control, said last mentioned means being arranged in such a manner that said manually operable member may independently control the position of said valve through said first mentioned means without interference from said automatic means, and means responsive to movement of said manually operable member for adjusting the setting of the automatic means.

HOWARD A. ALEXANDERSON.

REFERENCES CITED

The following references are of record in the file of this patent:

UNITED STATES PATENTS

| Number | Name | Date |
| --- | --- | --- |
| 1,563,988 | Howse | Dec. 1, 1925 |
| 1,816,787 | Moss | July 28, 1931 |
| 2,031,527 | Dodson | Feb. 18, 1936 |
| 2,205,354 | Gregg | June 18, 1940 |
| 2,302,358 | Tavel | Nov. 17, 1942 |
| 2,305,070 | Butler | Dec. 15, 1942 |
| 2,348,768 | Warner | May 16, 1944 |

FOREIGN PATENTS

| Number | Country | Date |
| --- | --- | --- |
| 158,297 | Germany | Feb. 16, 1905 |
| 387,567 | England | Feb. 9, 1933 |
| 571,979 | Germany | Mar. 16, 1933 |

Certificate of Correction

Patent No. 2,453,650.

November 9, 1948.

HOWARD A. ALEXANDERSON

It is hereby certified that errors appear in the printed specification of the above numbered patent requiring correction as follows:

Column 7, lines 71, 72, and 73, strike out the words and comma "actuating means operatively connected to said lever to affect said control means,"; and insert the same in column 8, line 10, after the word and comma "means,"; column 9, lines 68 and 70, and column 10, lines 21 and 23, for "adopted" read *adapted*; column 11, line 72, before "position" insert *the*; lines 73 and 74, strike out "and within a predetermined range of operation of said control member" and insert the same after the word and comma "means,", same column, line 75; column 12, line 25, after "means" strike out the comma; same line, after "control" insert *member,*; column 13, lines 8 and 9, strike out "an engine operating" and insert the same before "condition" in line 7, same column; line 9, before "control" first occurrence, insert *a*;

and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*